United States Patent
Li et al.

(10) Patent No.: US 7,865,655 B2
(45) Date of Patent: Jan. 4, 2011

(54) EXTENDED BLADE SERVER

(75) Inventors: Minqiu Li, Shenzhen (CN); Feng Hong, Shenzhen (CN); Chunming Sheng, Shenzhen (CN); Tinghong Wang, Shenzhen (CN); Xing Rao, Shenzhen (CN); Jin Yu, Shenzhen (CN); Shaolin Zhang, Shenzhen (CN); Hansi Wang, Shenzhen (CN); Dingliang Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 12/130,742

(22) Filed: May 30, 2008

(65) Prior Publication Data

US 2008/0250181 A1    Oct. 9, 2008

Related U.S. Application Data

(63) Continuation of application No. PCT/CN2006/003236, filed on Nov. 30, 2006.

(30) Foreign Application Priority Data

Dec. 1, 2005    (CN)    ............... 2005 2 0119927 U

(51) Int. Cl.
*G06F 13/00*    (2006.01)
*G06F 13/14*    (2006.01)

(52) U.S. Cl. .................. 710/316; 710/301; 710/305
(58) Field of Classification Search .......... 710/316
See application file for complete search history.

(56) References Cited

U.S. PATENT DOCUMENTS 6,370,585 B1 *   4/2002   Hagersten et al. ........ 709/238
6,693,901 B1 *   2/2004   Byers et al. ............. 370/362
6,701,404 B1 *   3/2004   Hamre et al. ............ 710/307

(Continued)

FOREIGN PATENT DOCUMENTS

CN    1643475 A    7/2005

(Continued)

OTHER PUBLICATIONS

"Technical Workgroup Computing Platform"; Scalable Servers Corporation; avaliable as of Nov. 8, 2007; pp. 1-4.*

(Continued)

*Primary Examiner*—Ryan M Stiglic
(74) *Attorney, Agent, or Firm*—Brinks Hofer Gilson & Lione

(57) ABSTRACT

The present invention relates to the field of communications, in particular, to a server for solving the problem related to the incompatibility between normal blades and multi-processing blades in a conventional server. The server according to an embodiment of the invention includes a backboard, on which backboard wiring and a first slot are disposed. At least two second slots are further disposed on the backboard. Both a first interface configured to be connected to a normal blade and a second interface configured to be connected to a multi-processing blade are disposed on each of the second slots, the first interface being connected to a corresponding Cluster Switch interface disposed on the first slot via the backboard wiring, and the second interface being interconnected directly via the backboard wiring or being connected to a corresponding Symmetrical Multi-Processing Switch interface disposed on the first slot via the backboard wiring.

18 Claims, 9 Drawing Sheets

U.S. PATENT DOCUMENTS

| | | | |
|---|---|---|---|
| 2004/0022022 A1* | 2/2004 | Voge | 361/684 |
| 2007/0079046 A1* | 4/2007 | Yang et al. | 710/316 |
| 2007/0110088 A1* | 5/2007 | Kemp et al. | 370/419 |
| 2008/0043769 A1* | 2/2008 | Hirai | 370/420 |
| 2008/0046705 A1* | 2/2008 | Hirai et al. | 713/1 |
| 2009/0043937 A1* | 2/2009 | Lee et al. | 710/305 |
| 2009/0156031 A1* | 6/2009 | Staiger et al. | 439/151 |

OTHER PUBLICATIONS

Marshall, David; "Scalable Servers Corporation Announces the flexBLADE Technical Workgroup Computing Platform"; vmblog.com; Nov. 8, 2007; pp. 1-6.*

International Search Report Issued in corresponding PCT Application No. PCT/CN2006/003236; mailed Mar. 15, 2007.

Dong, Xiaoshe et al. "Architecture and Interconnection of IBM Blade Cluster Server" Computer Applications; Feb. 2003 vol. 23. No. 2 pp. 62,63 & 67.

Dong, Xiao-she et al. "Architecture and Interconnection of IBA Blade Cluster Server" Computer Applications; pp. 62, 63 and 67; Feb. 2003 vol. 23 No. 2.

Written Opinion of the International Searching Authority issued in corresponding PCT Patent Application No. PCT/CN2006/003236, mailed Mar. 15, 2007. 3 pages.

* cited by examiner

US 7,865,655 B2

EXTENDED BLADE SERVER

CROSS-REFERENCE TO RELATED APPLICATIONS

The present application is a continuation application of commonly-assigned International Application No. PCT/CN2006/003236, filed Nov. 30, 2006, which claims the benefit of Chinese Patent Application No. 200520119927.3, filed on Dec. 1, 2005, both of which are herein incorporated by reference.

FIELD OF THE INVENTION

The present invention relates to the field of communications, in particular, to a server.

BACKGROUND OF THE INVENTION

At present, the server is being developed in two directions, one is the direction of a normal server, the other is the direction of a high-end server utilizing a high-performance multi-processing architecture. The high-end server includes a Symmetrical Multi-Processing (SMP) server utilizing an SMP architecture and a Cache Coherence-Non Uniform Memory Access (CC-Numa) server utilizing a CC-Numa architecture.

In an SMP server, a plurality of Central Processing Units (CPUs) operate symmetrically without primary and secondary relationships or dependent relationships among them. Each CPU shares the same physical Random Access Memory (RAM), and it takes each CPU the same time period to access the RAM at any address. Methods for extending an SMP server include adding RAM, using faster CPUs, adding CPUs, expanding I/O capabilities, and employing more external devices, such as disk storages, etc. The characteristics of a CC-Numa server are similar to those of an SMP server except that each CPU takes different periods to access local RAM and remote RAM.

A blade server is a low cost server platform with High Availability High Density (HAHD) designed specially for specific applications and high-density computer environments. Each of the blades in the blade server is a system mainboard which may start its own operating system, such as Windows NT/2000, Linux, Solaris, etc., through a local hard disk, with each of the blades serving as an independent server. In such an operating mode, each of the mainboards operates its own system and provides services for a designated user group without relationships among users. These blades may also be combined into a server cluster using system software. In the server cluster mode, all of the mainboards may be interconnected to provide a high-speed network environment, and share the resources to provide their respective services for the same user group. The performance of such a system may be improved by inserting new blades into the cluster. Since each blade is hot swappable, the system may be replaced easily and maintenance time may be minimized. In a blade server, CPUs may be configured into a variety of subsystems. The blade servers on the same rack may share the same set of devices including a CD driver, a floppy driver, a keyboard, a display, and a mouse via a new type of intelligent KVM switch board, so that a plurality of servers can be accessed, thereby facilitating the upgrade and maintenance of the system as well as the access of files on the blade servers.

At present, both a normal blade server and a multi-processing blade server in the prior art can meet the requirement for a high-performance and cost-effective server. However, interfaces and wiring at the slots on the backboard of a normal blade server, which are used for the insertion and interconnection of normal blades, are of normal blade-specific designs. The interfaces and wiring of a normal blade and those of a multiple-processing blade are not compatible with each other, as a result, it is difficult to flexibly configure the system by selecting the respective blades for various levels of services, and thus it is difficult to meet the requirement for a cost-effective server.

SUMMARY OF THE INVENTION

An embodiment of the present invention provides a server for solving the problem related to the incompatibility between normal blades and multi-processing blades in a conventional server.

A first server according to an embodiment of the invention includes a backboard, on which backboard wiring and at least one first slot are disposed. Both a number of Cluster Switch interfaces and a number of SMP Switch interfaces are disposed on the at least one first slot. At least two second slots are further disposed on the backboard. Both a first interface configured to be connected to a normal blade and a second interface configured to be connected to a multi-processing blade are disposed on each of the second slots, the first interface being connected to a corresponding Cluster Switch interface via the backboard wiring, and the second interface being connected to a corresponding SMP Switch interface via the backboard wiring.

The second interface may be further connected to a corresponding Cluster Switch interface. Alternatively, a third interface configured to be connected to the multi-processing blade is further disposed on each of the second slots, the third interface being connected to a corresponding Cluster Switch interface via the backboard wiring.

A second server according to an embodiment of the present invention includes a backboard, on which backboard wiring and at least one first slot are disposed. A number of Cluster Switch interfaces are disposed on the at least one first slot. At least two second slots are further disposed on the backboard. Both a first interface configured to be connected to a normal blade and a fourth interface configured to be connected to a multi-processing blade are disposed on each of the second slots, the first interface being connected to a corresponding Cluster Switch interface via the backboard wiring, and the fourth interfaces being connected with each other via the backboard wiring.

A number of Cluster Switch interfaces are further disposed on the at least one first slot, and a second interface configured to be connected to a multi-processing blade is further disposed on each of the second slots, the second interface being connected to a corresponding SMP Switch interface via the backboard wiring.

The multi-processing blades and the normal blades may coexist in the above-described servers. Moreover, the combination of blades may be adjusted dynamically in order to meet the requirement for flexible configurations of the system depending on various services, thereby minimizing user costs while ensuring that the system has a relatively high degree of extensibility.

DETAILED DESCRIPTION OF THE EMBODIMENTS

Figure 1:
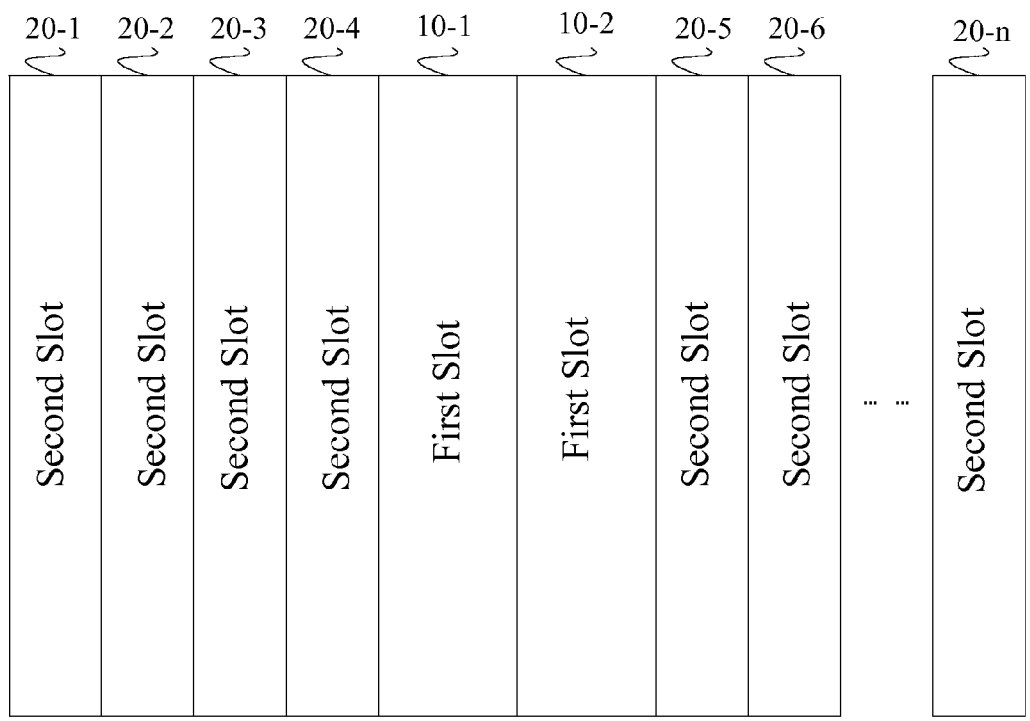
FIG. 1 is a schematic diagram showing a combination structure of slots in a server according to an embodiment of the invention.

A server according to an embodiment of the invention includes a backboard, on which backboard wiring and a plurality of slots, i.e. first slots 10-1 and 10-2, referred to collectively as first slots 10, and second slots 20-1, 20-2 . . . , and 20-n, referred to collectively as second slots 20, as shown in FIG. 1, are disposed. Two mutual backup first slots 10-1, 10-2 are generally disposed on the backboard for connecting to a Switch blade, and a plurality of second slots 20 parallel to each other are disposed on the backboard for connecting to a normal blade or a multi-processing blade.

Both a Cluster Switch and an SMP Switch can be included on a Switch blade. Cluster Switch interfaces and SMP Switch interfaces having the number as that of the second slots 20 are disposed on the first slots 10.

Figure 2:
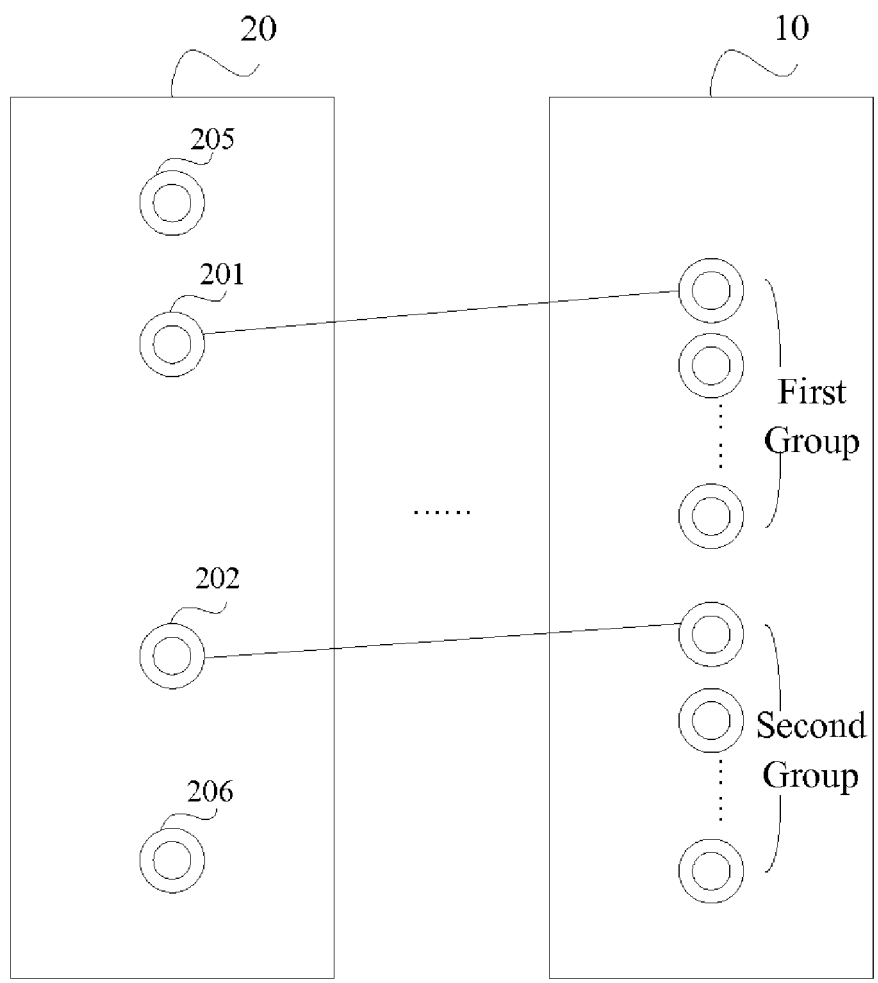
FIG. 2 is a schematic diagram showing an interface structure and connections between a first slot and a second slot in a server according to an embodiment of the invention.

Referring to FIG. 2, an interface structure and connections between an exemplary first slot 10 and an exemplary second slot 20 are shown. A first group of interfaces, i.e. a number of Cluster Switch interfaces configured to be connected to the Cluster Switch on the Switch blade, and a second group of interfaces, i.e. a number of SMP Switch interfaces configured to be connected to the SMP Switch on the Switch blade, are disposed on the first slot 10.

Again referring to FIG. 2, the interface disposed on the second slot 20 includes a first interface 201 configured to be connected to a normal blade. The first interface 201 is connected to one of the Cluster Switch interfaces via the backboard wiring. The first interface 201 enables the normal blades connected to the second slots 20 to be interconnected via a Cluster Switch on a Switch blade, thereby forming a normal blade server subsystem.

A second interface 202 is configured to be connected to a multi-processing blade. The second interface 202 is connected to one of the SMP Switch interfaces via the backboard wiring. The second interface 202 enables the multi-processing blades to be interconnected via an SMP Switch on a Switch blade, thereby forming an SMP server subsystem.

Figure 3:
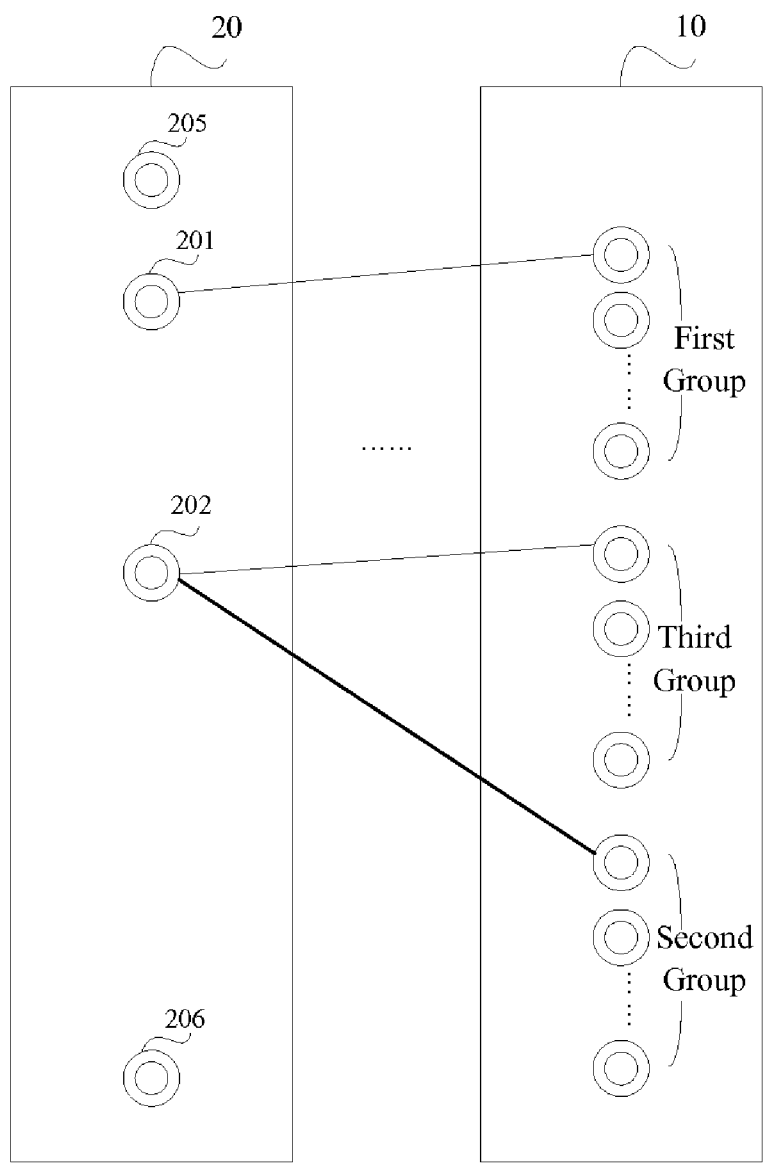
FIG. 3 is a schematic diagram showing an interface structure and connections between a first slot and a second slot in a server according to an embodiment of the invention.

Referring to FIG. 3, a third group of interfaces, i.e. a number of Cluster Switch interfaces may also be disposed on the first slot 10, and the second interface 202 on the second slot 20 is further connected to one of the third group of interfaces, i.e. Cluster Switch interfaces, via the backboard wiring. Thus, a SMP blade and a normal blade constitute a blade server via a Cluster Switch. In such a case, an SMP blade may be connected to an SMP Switch or a Cluster Switch on a Switch blade via the shared second interface 202.

Figure 4:
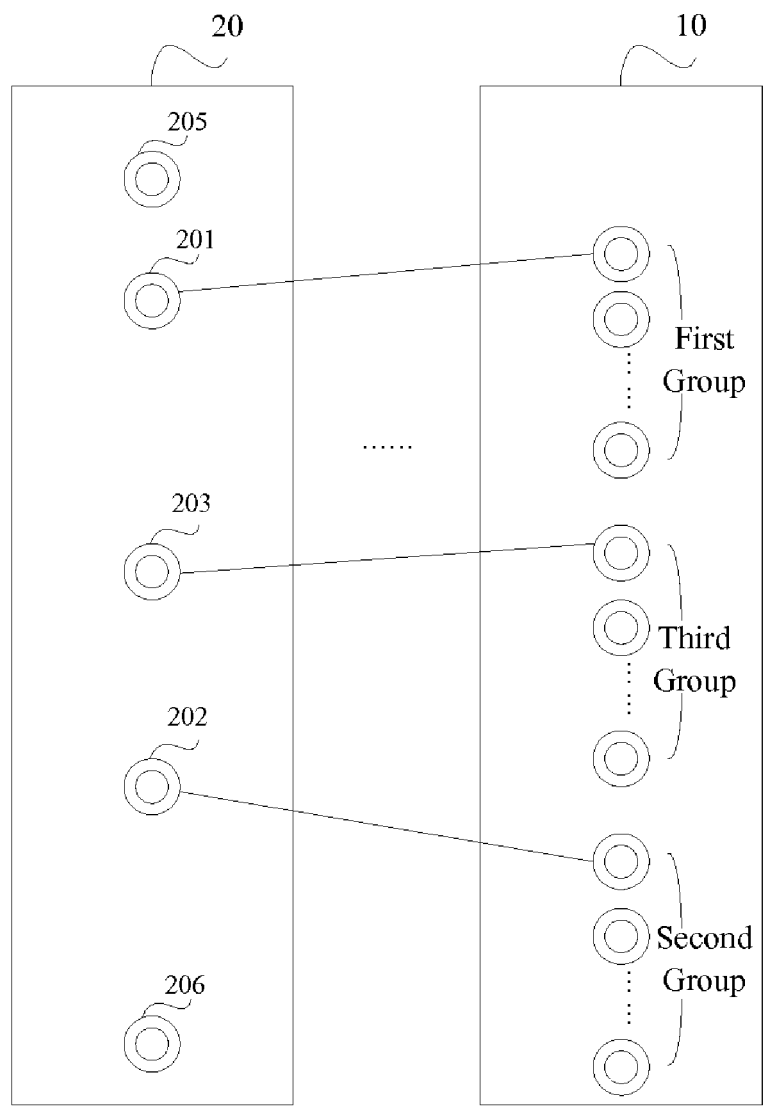
FIG. 4 is a schematic diagram showing an interface structure and connections between a first slot and a second slot in a server according to an embodiment of the invention.

As shown in FIG. 4, the interface on an SMP blade configured to be connected to the Cluster Switch on the Switch blade may be independently disposed. For example, a third interface 203 on the second slot 20 is configured to be connected to a multi-processing blade. The third interface 203 is connected to one of a third group of interfaces, i.e. Cluster Switch interfaces, via the backboard wiring. As such, the second interface 202 enables the multi-processing blades to be interconnected via an SMP Switch on a Switch blade, and the third interface 203 enables the multi-processing blades to be interconnected via a Cluster Switch on a Switch blade. Thus, an SMP blade and a normal blade constitute a blade server via a Cluster Switch.

The connection between a Cluster Switch and an SMP Switch on the same Switch blade may be enabled or disabled by enabling or disabling the SMP Switch.

Figure 5:
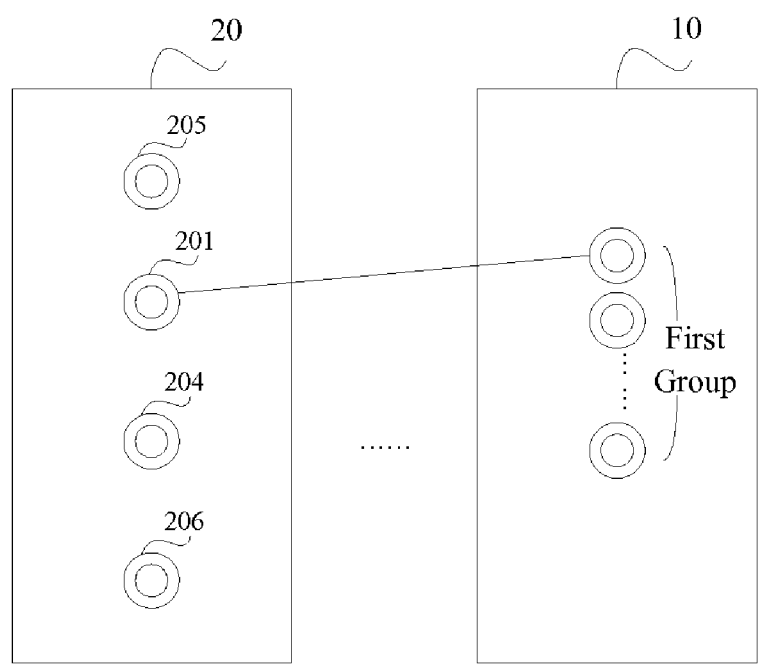
FIG. 5 is a schematic diagram showing an interface structure and connections between a first slot and a second slot in a server according to an embodiment of the invention.

As shown in FIG. 5, the multi-processing blades may also be interconnected directly via a high-speed bus. A fourth interface 204 configured to be connected to a multi-processing blade may further be disposed on the second slot 20. The fourth interface 204 is connected with another fourth interface via the backboard wiring. All of the multi-processing blades inserted into the second slots 20 are interconnected with each other through the fourth interface 204 via the backboard wiring. In this case, the normal blades may be interconnected by using a Switch blade provided only with a Cluster Switch.

Figure 6:
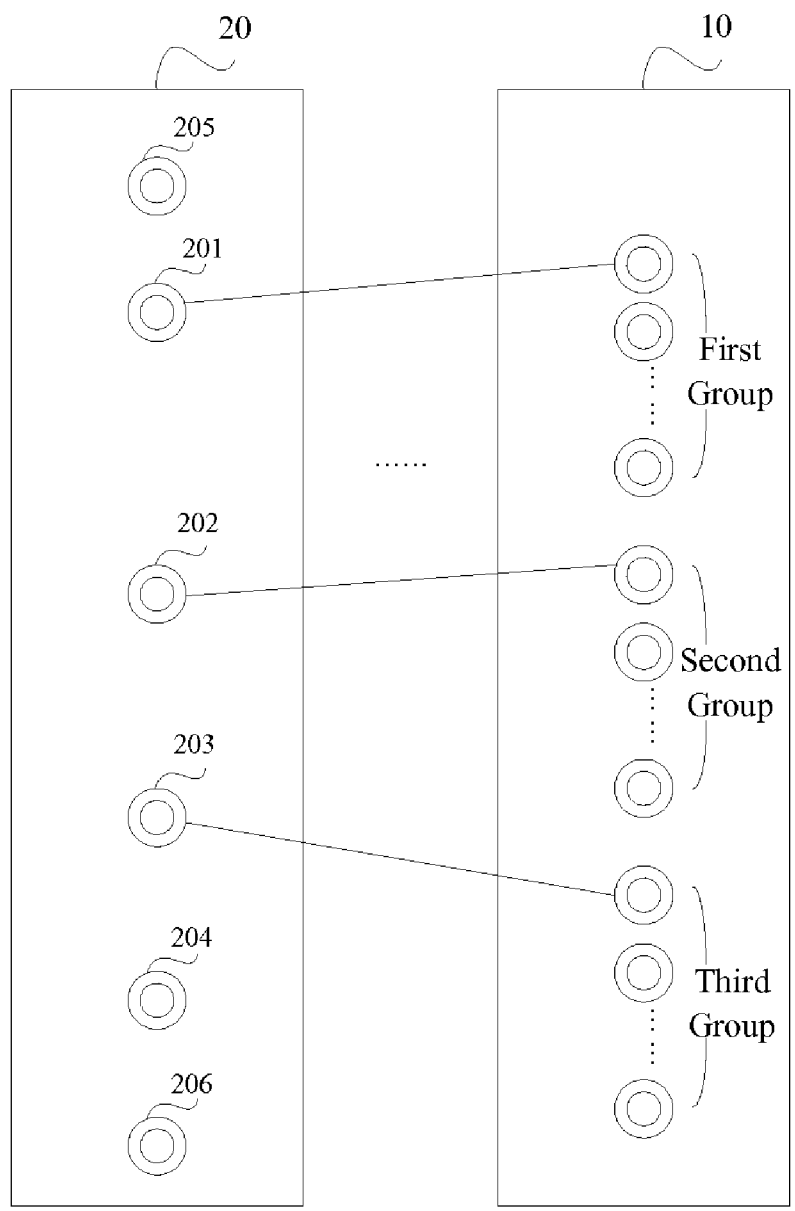
FIG. 6 is a schematic diagram showing an interface structure and connections between a first slot and a second slot in a server according to an embodiment of the invention.

In addition to the fourth interface 204, one or both of the second interface 202 and the third interface 203 may be disposed on each of the second slots 20. In this case, the SMP blades may be interconnected via an SMP Switch disposed on a Switch blade, or may be interconnected directly via the backboard wiring. For example, as shown in FIG. 6, the fourth interface 204, the second interface 202 and the third interface 203 are each disposed on the second slot 20.

Referring to FIG. 2-6, the normal blades may also be interconnected via an external switching device. Accordingly, a fifth interface 205 configured to be connected to a multi-processing blade is further disposed on each of the second slots 20. At least two normal blades inserted into the second slots may be interconnected through the fifth interface 205 using the external switching device. Further, a maintenance signal interface 206 shared by the normal blades and/or the multi-processing blades may be further disposed on each of the second slots 20.

In an embodiment of the invention, the backboard wiring may be in the form of a serial high-speed bus or parallel high-speed bus.

In an embodiment of the invention, a multi-processing blade includes an SMP blade and a CC-Numa blade.

In an embodiment of the invention, the first interface, the second interface or the third interface for interconnecting blades may be a 100-Megabit Ethernet interface, a 1000-Megabit Ethernet interface, or another high-speed interface, such as an Infiniband interface, a Myrinet interface, etc.

In an embodiment of the invention, with the above-described combination structure of the slots and the backboard wiring designed for it, the architecture of an SMP server (or a CC-Numa server) is combined with that of a blade server, so that an independent SMP server (or a CC-Numa server), an independent normal blade server, or a server with a hybrid architecture based on "a SMP server (or a CC-Numa server)+a normal blade server" may be constituted according to various user requirements. The combination of the blades may be determined by user application requirements, thereby minimizing and protecting users' device investment.

Figure 7:
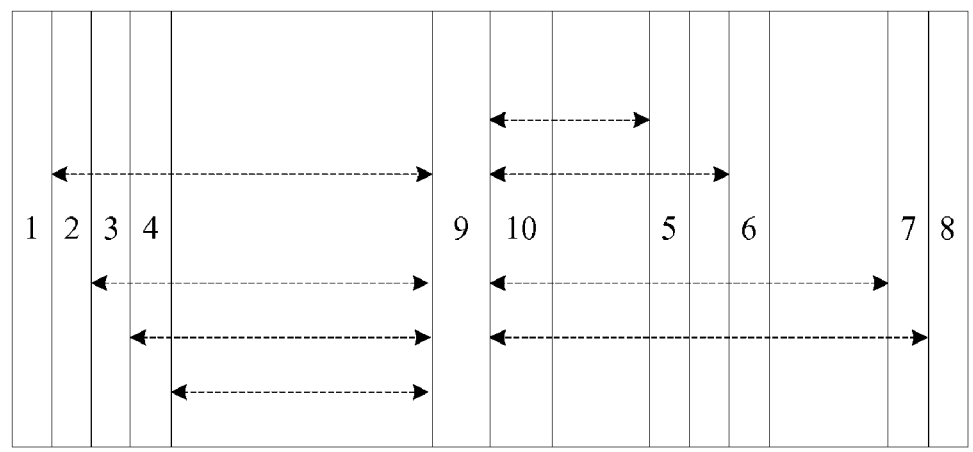
FIG. 7 is a schematic diagram showing a structure of a server according to an embodiment of the invention.

FIG. 7 is a schematic diagram showing a structure of a server according to an embodiment of the invention. Each of blades 1, 2, 3 and 4 is an SMP blade, each of blades 5, 6, 7 and 8 is a normal blade, and each of blades 9 and 10 is a Switch blade. The SMP blades 1, 2, 3 and 4 are each connected to the Switch blade 9 via a respective interface and backboard wiring, thereby constituting an SMP server subsystem. The normal blades 5, 6, 7 and 8 are each connected to the Switch blade 9 via a respective interface and backboard wiring, thereby constituting a normal blade server subsystem. With the Switch blade 9, the SMP server subsystem and the normal blade server subsystem may also constitute an extended server system with a hybrid architecture based on "an SMP server+a normal blade server". As shown in FIG. 7, the Switch blade 10 is a redundant backup of the Switch blade 9. For simplicity, any connection to the Switch blade 10 is not shown if redundant design is employed. The connections are the same as those of the Switch blade 9.

For the application of SMP blades, high-speed bus interfaces are interconnected via backboard wiring in each slot. The SMP blades are interconnected via the backboard. The high-speed bus is not required to go through the Switch blade 9 and the Switch blade 10. A bus interface interconnected with a Switch blade may also be disposed in each slot, and the SMP blades may be interconnected via an SMP Switch disposed in a Switch blade. Therefore, based on user requirements, normal blades may be configured into independent blade servers, and SMP blades may be combined into an integral SMP server or may be configured into independent SMP blade servers.

According to the application of blade servers, the interface for interconnecting blades may be in the form of a 100-Megabit/1000-Megabit Ethernet interface or another high-speed interface, such as an Infiniband interface, a Myrinet interface, etc.

Figure 8:
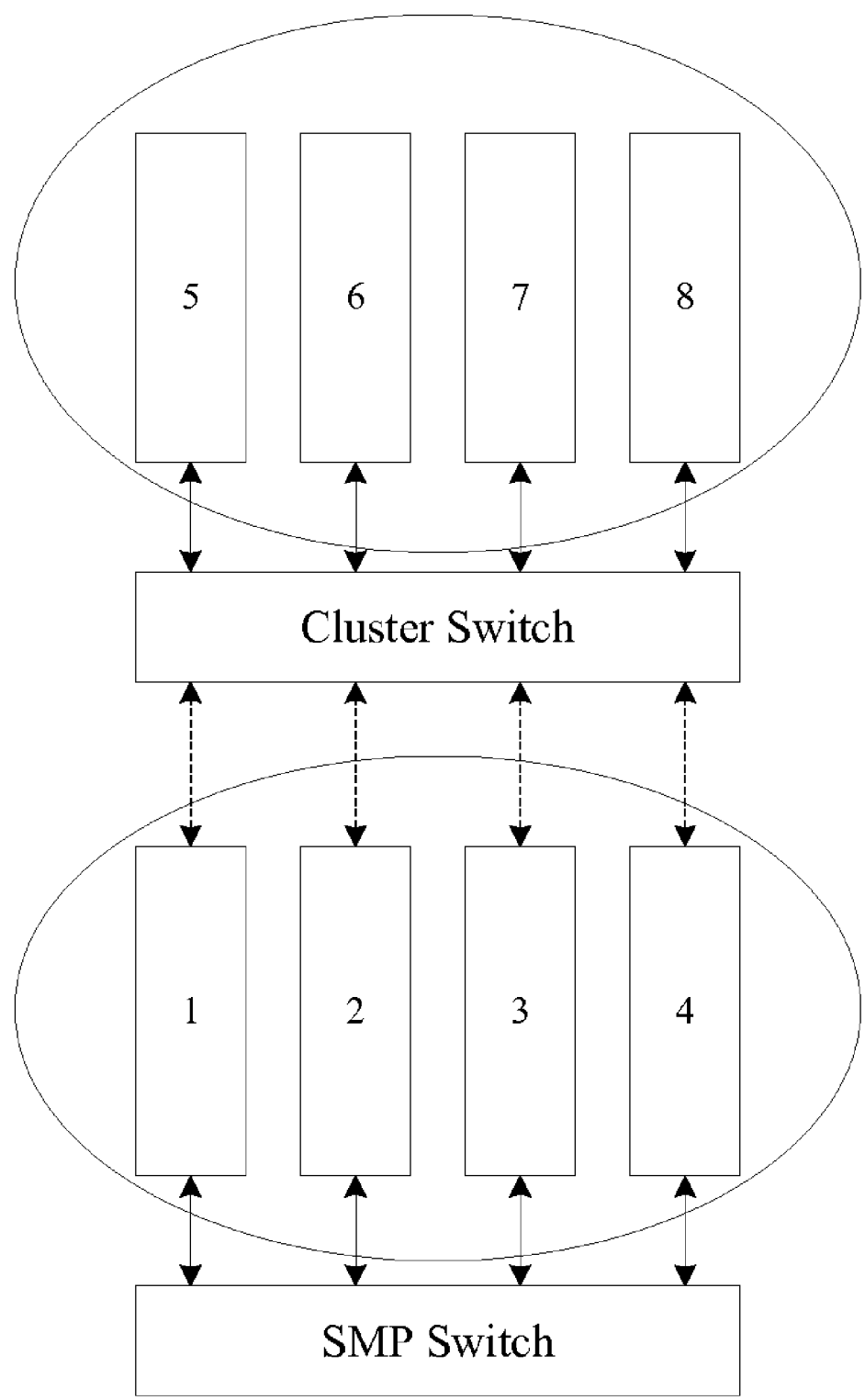
FIG. 8 is an exemplary application of a server according to an embodiment of the invention.

FIG. 8 shows an application embodiment of a server according to the invention. SMP blades 1, 2, 3 and 4 constitute an SMP server through an SMP Switch, and each of the SMP blades is connected to the Cluster Switch. One or more of the connections to the Cluster Switch may be enabled, thereby allowing the SMP server and normal blades 5, 6, 7 and 8 to constitute a blade server via the Cluster Switch; however, all of the connections may be disabled, thereby constituting an independent SMP server and an independent normal blade server. Both the Cluster Switch and the SMP Switch shown in FIG. 8 are disposed on a Switch blade.

Figure 9:
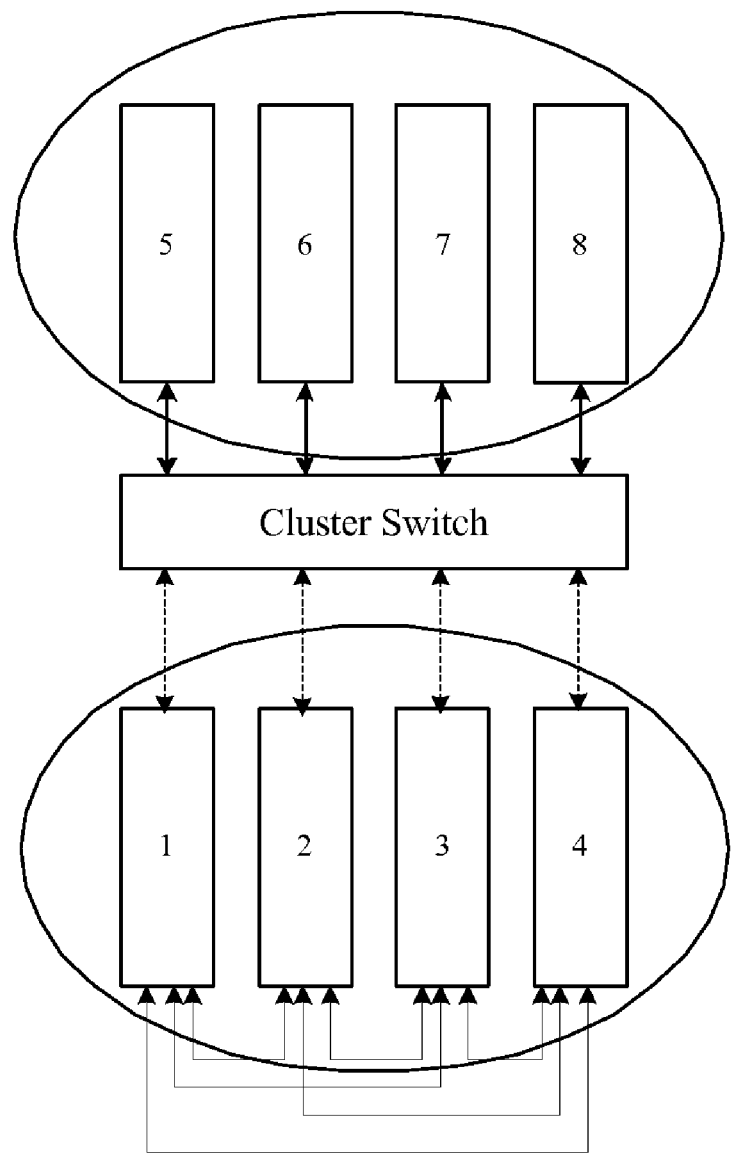
FIG. 9 is an exemplary application of a server according to an embodiment of the invention.

As shown in FIG. 9, in another application embodiment of a server according to the invention, SMP blades 1, 2, 3 and 4 are directly interconnected via a high-speed bus on the backboard, thereby constituting an SMP server, and each of the SMP blades is connected to the Cluster Switch via the backboard wiring and an interface. One or more of the connections to the Cluster Switch may be enabled, allowing the SMP server and normal blades 5, 6, 7 and 8 to constitute a normal blade server via the Cluster Switch; however, all of the interconnections may be disabled, thereby constituting an independent SMP server and an independent normal blade server. The Cluster Switch shown in FIG. 9 is disposed on a Switch blade.

In an embodiment of the invention, no connection between an SMP server and a normal blade server may exist, and a plurality of independent subsystems may be constituted, or a plurality of SMP server systems may be constituted, for example, SMP blades 1 and 2 may constitute an SMP system, while SMP blades 3 and 4 may constitute another SMP system, or they may be combined into a plurality of SMP blade server subsystems.

Additional advantages and modifications will readily occur to those skilled in the art. Therefore, the invention in its broader aspects is not limited to the specific details and representative embodiments shown and described herein. Accordingly, various variations and modifications may be made without departing from the spirit or scope of the invention as defined by the appended claims and their equivalents.

What is claimed is:

1. A server, comprising:
 a backboard wiring on the backboard, at least one first slot, and at least two second slots are disposed, the backboard having a number of Cluster Switch interfaces and a number of Symmetrical Multi-Processing (SMP) Switch interfaces disposed on the at least one first slot,
 wherein each of the at least two second slots includes a first interface configured to be connected to a normal blade and a second interface configured to be connected to a multi-processing blade, wherein each of the first interfaces is connected to a corresponding Cluster Switch interface via the backboard wiring, and each of the second interfaces being connected to a corresponding SMP Switch interface via the backboard wiring.

2. The server according to claim 1, wherein the second interface is further connected to a corresponding Cluster Switch interface.

3. The server according to claim 1, wherein a third interface configured to be connected to the multi-processing blade is further disposed on each of the second slots, wherein the third interface is connected to a corresponding Cluster Switch interface via the backboard wiring.

4. The server according to claim 1, wherein a fourth interface configured to be connected to a multi-processing blade is disposed on each of the second slots, wherein the respective fourth interfaces are connected with each other via the backboard wiring.

5. The server according to claim 4, wherein the backboard wiring is in the form of a serial high-speed bus or parallel high-speed bus.

6. The server according to claim 1, wherein a fifth interface configured to be connected to a normal blade is further disposed on each of the second slots, wherein the normal blade is connected to an external switching device through the fifth interface.

7. The server according to claim 1, wherein the multi-processing blade is an SMP blade or a Cache Coherence-Non Uniform Memory Access (CC-Numa) blade.

8. The server according to claim 1, wherein two mutual backup first slots are disposed in parallel.

9. The server according to claim 1, wherein a maintenance signal interface of at least one of the normal blades and the multi-processing blades is further disposed on each of the second slots.

10. A server, comprising:
 a backboard wiring on the backboard, at least one first slot, and at least two second slots are disposed, the backboard having a number of Cluster Switch interfaces disposed on the at least one first slot,
 wherein each of the at least two second slots includes a first interface configured to be connected to a normal blade and a second interface configured to be connected to a multi-processing blade, wherein each of the first interfaces is connected to a corresponding Cluster Switch interface via the backboard wiring, and the respective second interfaces are connected with each other via the backboard wiring.

11. The server according to claim 10, wherein a third interface configured to be connected to the multi-processing blade is further disposed on each of the second slots, wherein the third interface is connected to a corresponding Cluster Switch interface via the backboard wiring.

12. The server according to claim 11, wherein a fourth interface configured to be connected to a multi-processing blade is further disposed on each of the second slots, wherein the second interface is connected to a corresponding Symmetrical Multi-Processing (SMP) Switch interface via the backboard wiring.

13. The server according to claim 12, wherein the backboard wiring is in the form of a serial high-speed bus or parallel high-speed bus.

14. The server according to claim 10, wherein a fifth interface configured to be connected to a normal blade is further disposed on each of the second slots, and the normal blade is connected to an external switching device through the fifth interface.

15. The server according to claim 10, wherein the multi-processing blade is a SMP blade or a Cache Coherence-Non Uniform Memory Access (CC-Numa) blade.

16. The server according to claim 10, wherein two mutual backup first slots are disposed in parallel.

17. The server according to claim 10, wherein a maintenance signal interface for at least one of the normal blades and the multi-processing blades is further disposed on each of the second slots.

18. A backboard of a server, comprising:
at least one first slot, wherein the at least one first slot is coupled to a number of Cluster Switch interfaces and a number of Symmetrical Multi-Processing (SMP) Switch interfaces; and
at least two second slots, wherein each of the at least two second slots includes a first interfaces configured to be connected to a normal blade and a second interface configured to be connected to a multi-processing blade, wherein each of the first interfaces is connected to a corresponding Cluster Switch interface via back board wiring, and each of the second interfaces being connected to a corresponding SMP Switch interface via the backboard wiring.

* * * * *